(12) United States Patent
Sima et al.

(10) Patent No.: US 11,847,726 B2
(45) Date of Patent: Dec. 19, 2023

(54) METHOD FOR OUTPUTTING BLEND SHAPE VALUE, STORAGE MEDIUM, AND ELECTRONIC DEVICE

(71) Applicant: NANJING SILICON INTELLIGENCE TECHNOLOGY CO., LTD., Jiangsu (CN)

(72) Inventors: Huapeng Sima, Jiangsu (CN); Cuicui Tang, Jiangsu (CN); Zheng Liao, Jiangsu (CN)

(73) Assignee: Nanjing Silicon Intelligence Technology Co., Ltd., Jiangsu (CN)

( * ) Notice: Subject to any disclaimer, the term of this patent is extended or adjusted under 35 U.S.C. 154(b) by 0 days.

(21) Appl. No.: 17/926,563

(22) PCT Filed: Jul. 22, 2022

(86) PCT No.: PCT/CN2022/107491
§ 371 (c)(1),
(2) Date: Nov. 18, 2022

(87) PCT Pub. No.: WO2023/011221
PCT Pub. Date: Feb. 9, 2023

(65) Prior Publication Data
US 2023/0215068 A1 Jul. 6, 2023

(30) Foreign Application Priority Data
Aug. 6, 2021 (CN) .......................... 202110901418.X

(51) Int. Cl.
*G06T 13/20* (2011.01)
*G06T 13/40* (2011.01)
(Continued)

(52) U.S. Cl.
CPC ............ *G06T 13/205* (2013.01); *G06T 13/40* (2013.01); *G10L 15/02* (2013.01); *G10L 15/063* (2013.01);
(Continued)

(58) Field of Classification Search
CPC ....... G10L 15/02; G10L 15/063; G10L 19/00; G10L 25/30; G10L 15/22; G10L 25/57; G06T 13/205; G06T 13/40
See application file for complete search history.

(56) References Cited

U.S. PATENT DOCUMENTS 7,636,662 B2 * 12/2009 Dimtrova ........... H04N 21/4751
704/265
2006/0290699 A1 12/2006 Dimtrva et al.
(Continued)

FOREIGN PATENT DOCUMENTS

CN 1860504 A 11/2006
CN 109979429 A 7/2019
(Continued)

OTHER PUBLICATIONS

Chung et al., "You Said That?," Visual Geometry Group, Department of Engineering Science, University of Oxford, Oxford, UK, 2017, 12 pages.
(Continued)

*Primary Examiner* — Phi Hoang
(74) *Attorney, Agent, or Firm* — Foley & Lardner LLP

(57) ABSTRACT

A method for outputting a blend shape value includes: performing feature extraction on obtained target audio data to obtain a target audio feature vector; inputting the target audio feature vector and a target identifier into an audio-driven animation model; inputting the target audio feature vector into an audio encoding layer, determining an input feature vector of a next layer at a (2t−n)/2 time point based
(Continued)

on an input feature vector of a previous layer between a t time point and a t−n time point, determining a feature vector having a causal relationship with the input feature vector of the previous layer as a valid feature vector, outputting sequentially target-audio encoding features, and inputting the target identifier into a one-hot encoding layer for binary vector encoding to obtain a target-identifier encoding feature; and outputting a blend shape value corresponding to the target audio data.

9 Claims, 5 Drawing Sheets

(51) Int. Cl.
 *G10L 15/02* (2006.01)
 *G10L 15/06* (2013.01)
 *G10L 15/22* (2006.01)
 *G10L 19/00* (2013.01)
 *G10L 25/30* (2013.01)
 *G10L 25/57* (2013.01)
(52) U.S. Cl.
 CPC .............. *G10L 15/22* (2013.01); *G10L 19/00* (2013.01); *G10L 25/30* (2013.01); *G10L 25/57* (2013.01)

(56) References Cited

U.S. PATENT DOCUMENTS

| | | | |
|---|---|---|---|
| 2017/0039750 A1* | 2/2017 | Tong | G06T 13/40 |
| 2018/0276185 A1* | 9/2018 | Kaldma | G06F 40/151 |
| 2019/0095775 A1* | 3/2019 | Lembersky | G06N 3/006 |
| 2020/0135226 A1* | 4/2020 | Mittal | H04L 51/10 |
| 2020/0302667 A1 | 9/2020 | Del Val Santos et al. | |
| 2020/0380949 A1 | 12/2020 | Wu et al. | |
| 2021/0056348 A1 | 2/2021 | Berlin et al. | |
| 2021/0082453 A1* | 3/2021 | Guo | G06F 18/24 |
| 2021/0142818 A1* | 5/2021 | Edwards | G10L 21/10 |
| 2021/0248801 A1* | 8/2021 | Li | G06T 17/20 |
| 2021/0294840 A1* | 9/2021 | Lee | G06N 3/084 |
| 2021/0390945 A1* | 12/2021 | Zhang | G10L 13/08 |

FOREIGN PATENT DOCUMENTS

| | | |
|---|---|---|
| CN | 110751708 A | 2/2020 |
| CN | 111489424 A | 8/2020 |
| CN | 112786009 A | 5/2021 |
| CN | 113035228 A | 6/2021 |
| CN | 113592985 A | 11/2021 |

OTHER PUBLICATIONS

Yi, W. et al., "Deep Neural Networks Language Model Based on CNN and LSTM Hybrid Architecture," Journal of the China Society for Scientific and Technical Information, Feb. 2018, 37(2), pp. 194-205.

* cited by examiner

METHOD FOR OUTPUTTING BLEND SHAPE VALUE, STORAGE MEDIUM, AND ELECTRONIC DEVICE

CROSS-REFERENCE TO RELATED PATENT APPLICATIONS

The present application is a National Stage Entry under 35 U.S.C. § 371 of International Application No. PCT/CN2022/107491, filed Jul. 22, 2022, which claims priority to Chinese Application No. 202110901418.X, filed with the Chinese National Intellectual Property Administration on Aug. 6, 2021 and entitled "METHOD FOR OUTPUTTING BLEND SHAPE VALUE, STORAGE MEDIUM, AND ELECTRONIC DEVICE", each of which are incorporated herein by reference in their entirety.

FIELD OF THE INVENTION

This application relates to the technical field of data processing, and in particular, to a method for outputting a blend shape value, a storage medium, and an electronic device.

BACKGROUND OF THE INVENTION

Research on voice-driven three-dimensional facial animations is an important content in the field of natural human-computer interactions. Voice-driven three-dimensional facial animation synthesis is to preprocess a real sound recording or speech synthesized by using the text to speech (TTS for short) technology, so that a lip animation and a facial expression corresponding to the speech are driven to be synthesized on a virtual three-dimensional face avatar.

In the related art, the research on the voice-driven three-dimensional facial animation mainly focus on synthesis synchronization, precise lip animation, and facial expression classification through speech analysis. At present, there is no better method for driving a lip animation and a facial expression of a virtual human through speech at the same time. Lack of facial expression can make an expression of the voice-driven virtual human dull and sluggish. As a result, there is no richer information feedback, which reduces comprehensibility and cognition for human-computer interactions.

For a technical problem in the related art that the lip animation and the facial expression of the virtual human cannot be efficiently driven at the same time through speech, no effective solution has been proposed.

SUMMARY OF THE INVENTION

Embodiments of this application provide a method for outputting a blend shape value, a storage medium, and an electronic device, so as to resolve at least a technical problem in the related art that a lip animation and a facial expression of a virtual human cannot be efficiently driven at the same time through speech.

In an embodiment of this application, a method for outputting a blend shape value is provided, including: performing feature extraction on obtained target audio data, to obtain a target audio feature vector; inputting the target audio feature vector and a target identifier into an audio-driven animation model, wherein the target identifier is an identifier selected from preset identifiers used to indicate preset speaking styles, and the audio-driven animation model includes an audio encoding layer and a one-hot encoding layer; inputting the target audio feature vector into the audio encoding layer including multiple convolutional layers, determining an input feature vector of a next layer at a $(2t-n)/2$ time point based on an input feature vector of a previous layer between a $t$ time point and a $t-n$ time point, determining a feature vector having a causal relationship with the input feature vector of the previous layer as a valid feature vector, outputting sequentially target-audio encoding features based on the valid feature vector of each layer, and inputting the target identifier into the one-hot encoding layer for binary vector encoding, to obtain a target-identifier encoding feature, where $n<t$; and outputting a blend shape value corresponding to the target audio data based on the target-audio encoding feature and the target-identifier encoding feature by using the audio-driven animation model, wherein the blend shape value is used to indicate a lip animation and a facial expression of a virtual object, and the blend shape value corresponds to the target identifier.

In an embodiment of this application, an apparatus for outputting a blend shape value is further provided, including: a feature extraction module, configured to perform feature extraction on obtained target audio data, to obtain a target audio feature vector; an input model, configured to input the target audio feature vector and a target identifier into an audio-driven animation model, wherein the target identifier is an identifier selected from preset identifiers used to indicate preset speaking styles, and the audio-driven animation model includes an audio encoding layer and a one-hot encoding layer; an encoding model, configured to input the target audio feature vector into the audio encoding layer including multiple convolutional layers, determine an input feature vector of a next layer at a $(2t-n)/2$ time point based on an input feature vector of a previous layer between a $t$ time point and a $t-n$ time point, determine a feature vector having a causal relationship with the input feature vector of the previous layer as a valid feature vector, output sequentially target-audio encoding features based on the valid feature vector of each layer, and input the target identifier into the one-hot encoding layer for binary vector encoding, to obtain a target-identifier encoding feature, where $n<t$; and an output module, configured to output a blend shape value corresponding to the target audio data based on the target-audio encoding feature and the target-identifier encoding feature by using the audio-driven animation model, wherein the blend shape value is used to indicate a lip animation and a facial expression of a virtual object, and the blend shape value corresponds to the target identifier.

In an embodiment of this application, a computer readable storage medium is further provided, including a computer program stored thereon, which, on being run, is configured to execute the steps in the foregoing method embodiment.

In an embodiment of this application, an electronic device is further provided, including a memory and a processor, wherein a computer program is stored in the memory, and the processor is configured to run the computer program to execute the steps in the foregoing method embodiment.

According to the embodiments of this application: feature extraction is performed on the obtained target audio data, to obtain the target audio feature vector; the target audio feature vector and the target identifier are input into the audio-driven animation model, wherein the target identifier is an identifier selected from the preset identifiers used to indicate the preset speaking styles, and the audio-driven animation model includes the audio encoding layer and the one-hot encoding layer; the target audio feature vector is input into the audio encoding layer including multiple convolutional layers, the input feature vector of a next layer at the (2t−n)/2 time point is determined based on the input feature vector of a previous layer between the t time point and the t−n time point, the feature vector having a causal relationship with the input feature vector of the previous layer is determined as the valid feature vector, the target-audio encoding features are sequentially output based on the valid feature vector of each layer, and the target identifier is input into the one-hot encoding layer for binary vector encoding, to obtain the target-identifier encoding feature, wherein n<t; and the blend shape value corresponding to the target audio data is output by using the audio-driven animation model based on the target-audio encoding feature and the target-identifier encoding feature, wherein the blend shape value is used to indicate the lip animation and the facial expression of the virtual object, and the blend shape value corresponds to the target identifier. Therefore, the lip animation and the facial expression of the virtual human can be efficiently driven at the same time through speech. Compared with an existing encoding manner for a convolutional neural network, the encoding manner used in this application has a fast calculation speed and low consumption, which greatly improves an animation generation speed. Further, a speech animation can be generated in a real-time manner based on audio; and meanwhile, in combination with a target identifier code, a speech animation of a specified character style can be generated. And the encoding manner used in this application is suitable for various application scenarios.

BRIEF DESCRIPTION OF THE DRAWINGS

The accompanying drawings described herein are used to provide further understanding of this application, and constitute a part of this application. The exemplary embodiments and descriptions of this application are used to explain this application, and do not constitute an improper limitation to this application. In the accompanying drawings.

DETAILED DESCRIPTION OF THE EMBODIMENTS

This application is described below in detail with reference to the accompanying drawings and in combination with the embodiments. It should be noted that the embodiments in this application and the features in the embodiments can be combined with each other in the case of no conflict.

It should be noted that the terms "first", "second", and the like in this specification, the claims, and the accompanying drawings of this application are intended to distinguish between similar objects, but are not necessarily intended to describe a particular sequence or a sequential order.

Facial animation is widely applied in human-computer interactions, digital entertainment, and other aspects. Synchronization between a lip animation and a facial expression of a virtual object is a key to facial animation. If the virtual object only has a lip animation or has a lip animation and a facial expression with being not synchronized with each other while speaking, the voice may sound unreal and unnatural.

The method in this application can be applied to a hardware device capable of running an instruction, such as a notebook, a desktop computer, a mobile phone, and another hardware device having a display function. Implementing the method by running the instruction and displaying on a display screen of the hardware device can not only greatly simplify a tedious audio-visual synchronization process in an animation production process, but also bring a better viewing experience to a user.

Figure 1:
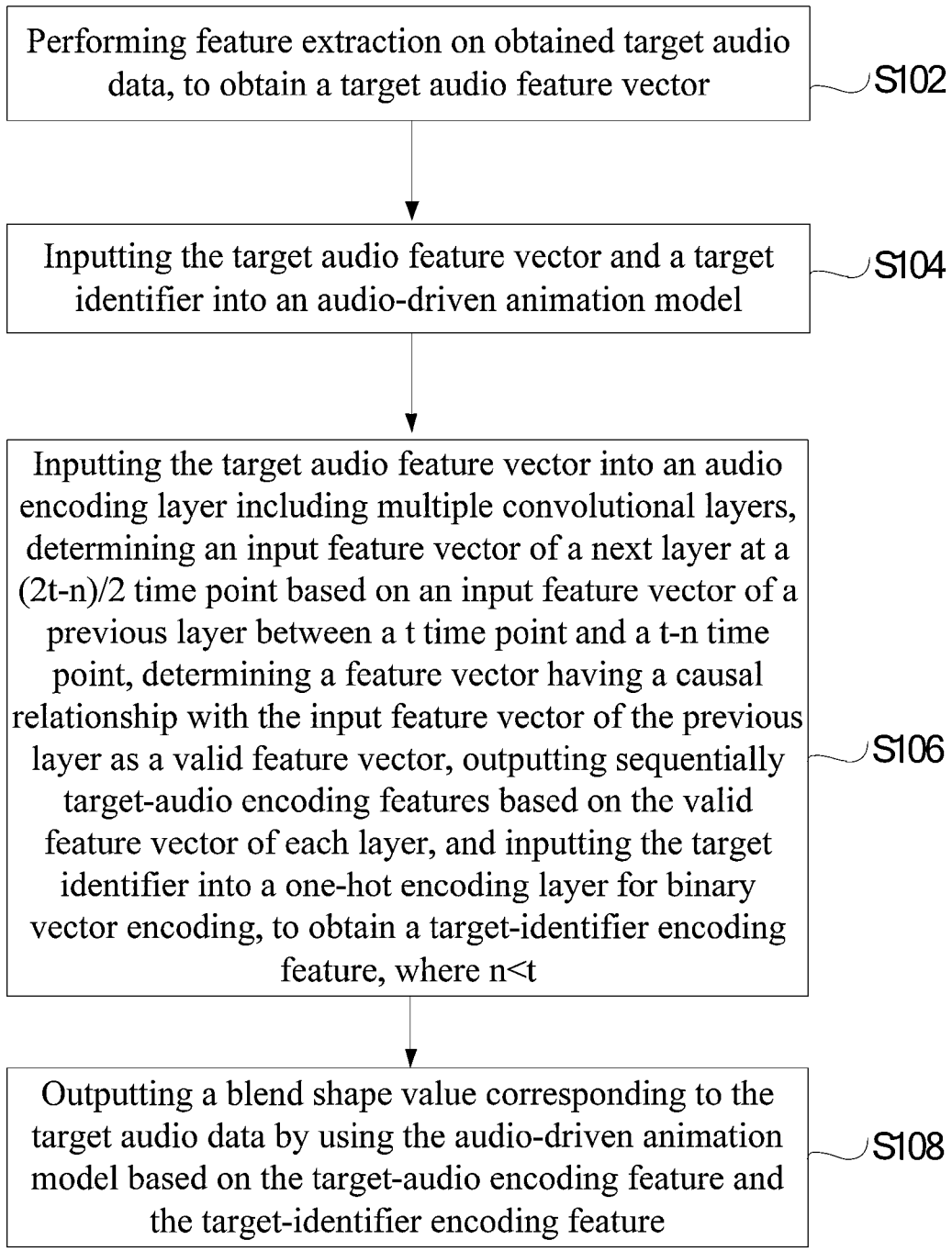
FIG. 1 is a flowchart of an optional method for outputting a blend shape value according to an embodiment of this application.

As shown in FIG. 1, a method for outputting a blend shape value is provided in an embodiment of this application, including:

Step S102. Performing feature extraction on obtained target audio data, to obtain a target audio feature vector;

Step S104. Inputting the target audio feature vector and a target identifier into an audio-driven animation model, wherein the target identifier is an identifier selected from preset identifiers used to indicate preset speaking styles, and the audio-driven animation model includes an audio encoding layer and a one-hot encoding layer;

Step S106. Inputting the target audio feature vector into the audio encoding layer including multiple convolutional layers, determining an input feature vector of a next layer at a (2t−n)/2 time point based on an input feature vector of a previous layer between a t time point and a t−n time point, determining a feature vector having a causal relationship with the input feature vector of the previous layer as a valid feature vector, outputting sequentially target-audio encoding features based on the valid feature vector of each layer, and inputting the target identifier into the one-hot encoding layer for binary vector encoding, to obtain a target-identifier encoding feature, wherein n<t; and Step S108. Outputting a blend shape value corresponding to the target audio data based on the target-audio encoding feature and the target-identifier encoding feature by using the audio-driven animation model, wherein the blend shape value is used to indicate a lip animation and a facial expression of a virtual object, and the blend shape value corresponds to the target identifier.

It should be noted that a network architecture involved in the technical solutions of this embodiment of this application includes an audio receiving device, an animation display device, and an artificial intelligence server. The foregoing method for outputting a blend shape value is implemented on the artificial intelligence server. The audio receiving device and the animation display device in this embodiment of this application are not limited to independent devices, and can also be integrated into another hardware device with a sound pickup function and an animation display function, such as a large LED screen with a speech recognition function or a mobile phone terminal. This is not limited in this embodiment of this application.

In the foregoing method for outputting a blend shape value, regarding inputting the target audio feature vector and the target identifier into the audio-driven animation model, it can be understood that the target audio feature vector is a characterization parameter of audio, and the target identifier is an identifier selected for indicating a preset speaking style. Moreover, the blend shape value corresponding to the target audio data is obtained by inputting the target audio feature vector and the target identifier into the audio-driven animation model, wherein the blend shape value is used to indicate the lip shape and the facial expression of the virtual object. In other words, the obtained blend shape value can indicate the lip shape and the facial expression of the virtual object at the same time; this is exactly a key point of synchronizing the lip shape and the expression. Moreover, synchronization between the lip shape and the facial expression of the virtual object is implemented by outputting the blend shape value. In this case, an unnatural phenomenon caused by asynchronization between the lip shape and the facial expression is resolved, thereby improving synthesis quality of an animation.

Regarding that the preset identifier involved in this embodiment of this application is used to indicate the preset speaking style, it can be understood as that the preset identifier correspondingly indicates facial expressions, lip shapes, and the like of speakers of different styles while speaking. In other words, while synchronizing the lip shape and the facial expression of the virtual object, synchronization between the lip shape and the facial expression of people of different styles while speaking can also be displayed. In this case, an animation effect is added, thereby avoiding boringness due to a single style.

Figure 2:
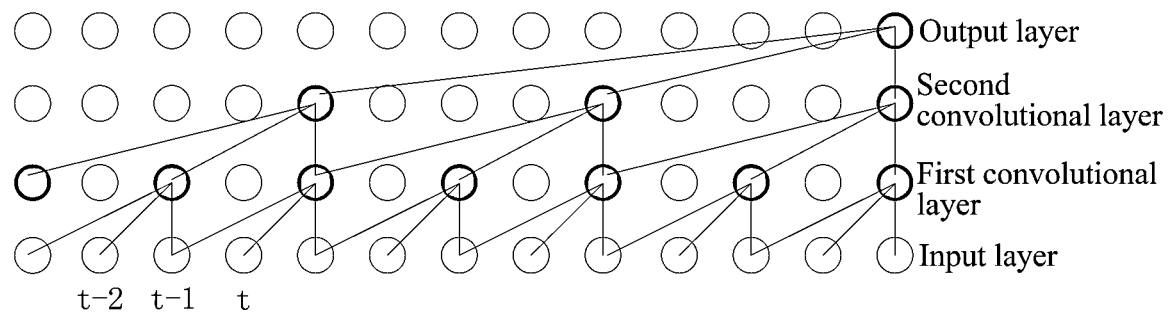
FIG. 2 is a schematic diagram of an optional audio feature encoding manner according to an embodiment of this application.

It should be noted that in this embodiment of this application, a process of encoding the target audio feature by using the audio encoding layer is shown in FIG. 2. The audio encoding layer can include an input layer, a multi-layer convolutional layer, and an output layer. To intuitively display the encoding process, description is made in FIG. 2 by using two convolutional layers as an example. An input feature vector of a next layer at a $(2t-n)/2$ time point is determined based on an input feature vector of a previous layer between a t time point and $(2t-n)/2$ time point. In this embodiment of this application, using $n=2$ as an example, an input feature vector of a first convolutional layer at a time point $t-1$ is determined based on input feature vectors of the input layer at time points $t$, $t-1$, and $t-2$, and is determined as a valid feature vector. Subsequently, a valid feature vector of a second convolutional layer can be determined based on the valid feature vector of the first convolutional layer, so as to output the target-audio encoding feature by using the output layer. With reference to FIG. 2, it can be learned that compared with a conventional cyclic neural network structure, the audio encoding layer in this embodiment of this application can not only obtain time sequence information of a sequence, but also has advantages of fast calculation speed and low consumption. Moreover, an upper layer has more idle convolution channels on the convolutional layer, and a convolutional window formed by the idle convolution channels is larger.

In an actual calculation process, for a certain convolutional layer, a convolutional window where the foregoing audio encoding layer is located can be used to learn, at a current time sequence, output corresponding to a previous convolutional layer at a previous time sequence (there may be one or more previous time sequences, which can be set according to requirements. For example, in each calculation process, the convolutional window learns outputs corresponding to the previous convolutional layer at three previous time sequences respectively). In other words, at the current time sequence, the convolutional layer comprehensively calculates an output at a current time point according to an input at the previous time sequence. In this way, in this embodiment, there is no need to provide an additionally convolutional layer for the audio encoding layer during the calculation process to calculate the output corresponding to the previous convolutional layer at the previous time sequence. However, this effect can be achieved through the convolutional window of the convolutional layer itself.

Compared with the related art that it is necessary to extend a model structure of multiple convolutional layers when more calculation parameters are introduced, the audio encoding layer in this embodiment can significantly reduce a quantity of convolutional layers. For example, for a network structure of an audio encoding layer composed of three convolutional layers, it is set that the convolutional layer needs to learn the outputs corresponding to the previous convolutional layer at three previous time sequences respectively during the calculation process. In this case, a conventional method in the related art is used, and it is necessary to extend three convolutional layers respectively for last two convolutional layers in the audio encoding layer, to correspondingly learn the outputs corresponding to the previous convolutional layer at three previous time sequences respectively. The expanded audio encoding layer thus includes nine convolutional layers, and a network volume thereof is significantly increased. By contrast, the audio encoding layer in this embodiment does not need to perform additional expansion on the convolutional layer, and this effect can be achieved through convolutional windows of the last two convolutional layers in the three convolutional layers of the audio encoding layer. Therefore, the audio encoding layer in this embodiment can significantly control a model volume while a model effect is improved through learning of a causal relationship.

In an embodiment, before the target audio feature vector and the target identifier are input into the audio-driven animation model, the method further includes:

training the audio-driven animation model by using sample data. The sample data includes collected audio data of a speaking object, facial data of the speaking object that is collected synchronously with the audio data, and a sample blend shape value corresponding to the facial data. The facial data includes a lip shape and a facial expression.

Figure 3:
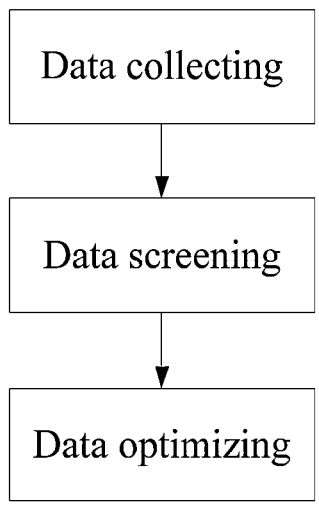
FIG. 3 is a schematic diagram of an optional process for preprocessing training data according to an embodiment of this application.

It should be noted that, before training the audio-driven animation model by using the sample data, this embodiment of this application further includes a process of preprocessing the audio data. The preprocessing process includes three parts: data collecting, data screening, and data optimizing. The overall flow chart is shown in FIG. 3.

An example is made by using an iphone as a data collection device. As a data collection device, the iphone can implement real-time face capture with low costs due to structured light and the built-in arkit technology of the iphone. During actual data collecting, 40 fixed sentences can be used, and 20 actors speak to the iPhone with specific expressions in a same environment. The iphone is used to record audio when the actor is speaking, and 52 blend shapes (bs for short) are carried in each frame of arkit. Subsequently, data screening is performed, to manually screen out data with better quality, and exclude various environmental reasons or actor errors. Finally, considering accuracy of the data, the data is manually optimized by an animator, and an inaccurate part in the data is optimized by means of animating manually. The optimized data is the training data that can be used later.

In an embodiment, training the audio-driven animation model by using the sample data includes:

extracting a local feature vector of the audio data by using an automatic speech recognition model;

inputting the local feature vector into the audio encoding layer including multiple convolutional layers, determining an input feature vector of a next layer at a (2t−n)/2 time point based on an input feature vector of a previous layer between a t time point and a t−n time point, determining a feature vector having a causal relationship with the input feature vector of the previous layer as a valid local feature vector, and outputting sequentially audio encoding features corresponding to the audio data based on the valid local feature vector of each layer;

inputting an identifier corresponding to the facial data of the speaking object into the one-hot encoding layer to obtain an identifier encoding feature corresponding to the identifier, wherein different facial data corresponds to different speaking styles, and the identifier is used to indicate the speaking style;

splicing the audio encoding feature and the identifier encoding feature for encoding and decoding, to output a predicted blend shape value corresponding to the audio data, where the predicted blend shape value corresponds to the identifier; and training, based on an error between the sample blend shape value and the predicted blend shape value, a model parameter of the audio-driven animation model by using a loss function.

It should be noted that, in actual use, a generalized audio feature extraction manner is required due to various sound receiving devices and sound sources. Therefore, an automatic speech recognition model, such as a masr model or a deepspeech model, is used to perform feature extraction on speech. Feature extraction is performed on the audio by obtaining a feature of an intermediate layer. An advantage of this is that the speech recognition model is trained with a large number of corpora, and the obtained audio feature has good generalization to different languages, different receiving devices, and different speakers.

A training module uses a deep learning network, an input thereof is the audio feature and a user id (which is equivalent to the identifier) when the data is recorded, and an output thereof is a blend shape value at corresponding time. To preserve a facial expression while speaking, the speaking styles of different recording personnel are encoded, and a one-hot encoding manner is used herein for direct encoding. An audio code includes both general pronunciation information and information about a small amount of personalized speaking styles.

In an embodiment, training, based on the error between the sample blend shape value and the predicted blend shape value, the model parameter of the audio-driven animation model by using the loss function includes:

obtaining a reconstruction error, a velocity error, and an acceleration error between the sample blend shape value and the predicted blend shape value by using an L2 loss function; and training the model parameter of the audio-driven animation model based on the reconstruction error, the velocity error, and the acceleration error.

It should be noted that the L2 loss function can be used during the training. To reproduce a captured blend shape coefficient, an L2 error between a real blend shape coefficient and a predicted blend shape coefficient is calculated. And to make a prediction effect more accurate and stable, errors of orders 1-3 can be calculated. Physical meanings of the errors correspond to the reconstruction error, the velocity error, and the acceleration error, respectively.

In an embodiment, splicing the audio encoding feature and the identifier encoding feature for encoding and decoding includes:

splicing and outputting the audio encoding feature and the identifier encoding feature to an encoding layer, to obtain a spliced feature code, wherein the encoding layer includes three fully-connected network layers; and inputting the spliced feature code into a decoding layer, through which the predicted blend shape value corresponding to the identifier is outputted, wherein the decoding layer includes three fully-connected network layers.

In an embodiment, outputting the blend shape value corresponding to the target audio data based on the target-audio encoding feature and the target-identifier encoding feature by using the audio-driven animation model includes:

splicing the target-audio encoding feature and the target-identifier encoding feature for encoding and decoding, to output the blend shape value corresponding to the target audio data.

Figure 4:
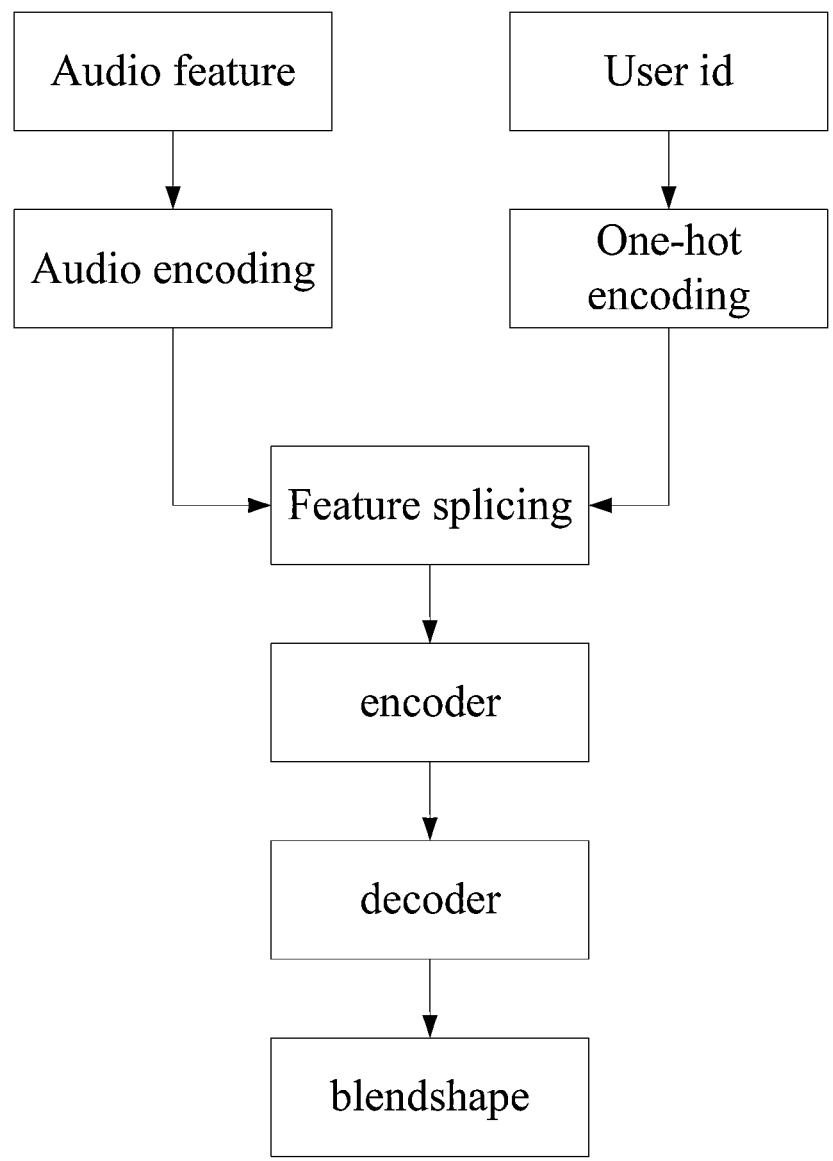
FIG. 4 is a schematic diagram of an optional training process of an audio-driven animation model according to an embodiment of this application.

As shown in FIG. 4, the training process of the audio-driven animation model includes feature encoding, feature splicing, and output of the blend shape value. To achieve a more realistic three-dimensional facial animation, a user code (which is equivalent to a target identifier code) is spliced with the audio code. While ensuring that the pronunciation information is sufficiently generalized, character personalization information is added to achieve better reproduction of the lip animation and the facial expression. The spliced features are sent to a network having an architecture of an encoder and a decoder. Output of a decoder module is a final blend shape coefficient, wherein both the encoder and the decoder can be composed of a three-layer fully connected network.

In an embodiment, after outputting the blend shape value corresponding to the target audio data, the method further includes:

displaying a video image corresponding to the blend shape value on a display screen based on the blend shape value corresponding to the target audio data and a three-dimensional scenario corresponding to the target identifier.

During actually driving, the audio is first obtained by an audio receiving device, and then feature extraction is performed on the audio by using an audio preprocessing module. The user id is preset to an id of a desired speaking style. The audio feature and the user id are input into a pre-trained audio-driven three-dimensional facial animation model, to output a bs value of a corresponding frame, which is transmitted to ue4 (an unreal engine). Various scenarios and a required blend shape have been built in the ue4, with being rendered to various terminal devices through the ue4.

Figure 5:
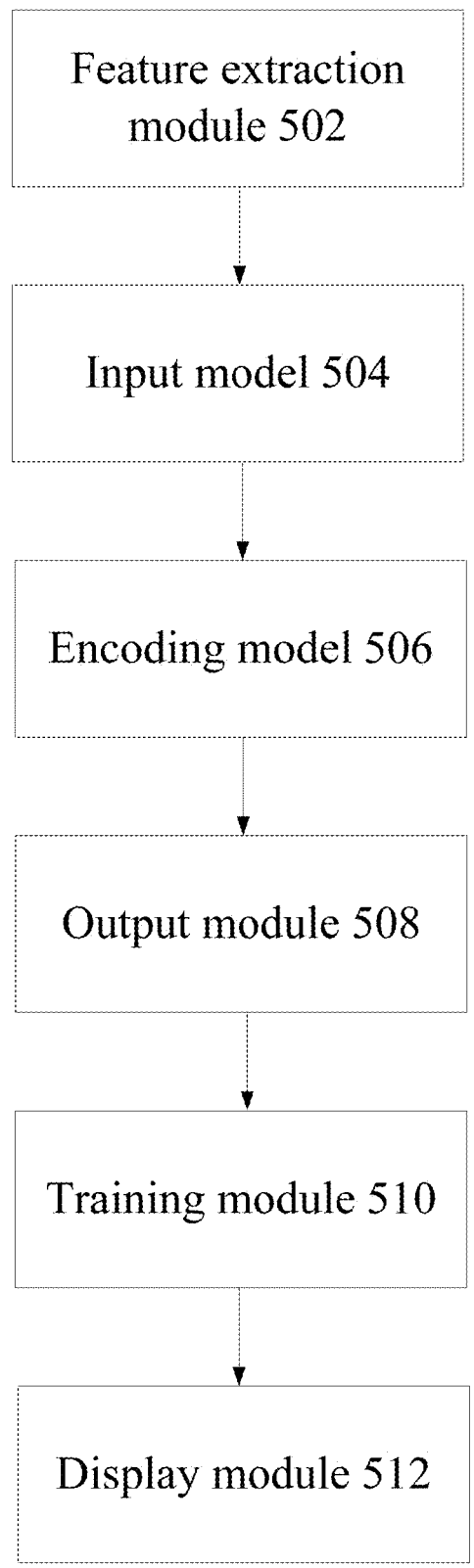
FIG. 5 is a structural block diagram of an optional apparatus for outputting a blend shape value according to an embodiment of this application.

An embodiment of this application further provides an apparatus for outputting a blend shape value, as shown in FIG. 5, including:

a feature extraction module 502, configured to perform feature extraction on obtained target audio data, to obtain a target audio feature vector;

an input model 504, configured to input the target audio feature vector and a target identifier into an audio-driven animation model, wherein the target identifier is an identifier selected from preset identifiers used to indicate preset speaking styles, and the audio-driven animation model includes an audio encoding layer and a one-hot encoding layer;

an encoding model 506, configured to input the target audio feature vector into the audio encoding layer including multiple convolutional layers, determine an input feature vector of a next layer at a (2t−n)/2 time point based on an input feature vector of a previous layer between a t time point and a t−n time point, determine a feature vector having a causal relationship with the input feature vector of the previous layer as a valid feature vector, output sequentially target-audio encoding features based on the valid feature vector of each layer, and input the target identifier into the one-hot encoding layer for binary vector encoding, to obtain a target-identifier encoding feature, wherein n<t; and an output module 508, configured to output a blend shape value corresponding to the target audio data based on the target-audio encoding feature and the target-identifier encoding feature by using the audio-driven animation model, wherein the blend shape value is used to indicate a lip animation and a facial expression of a virtual object, and the blend shape value corresponds to the target identifier.

In an exemplary embodiment, description is made by using an example in which user speech is imitated at a mobile phone. A user performs sound receiving through a terminal program of the mobile phone. Audio is obtained by an audio device, and then feature extraction is performed on the audio by using an audio preprocessing module. A user id is preset to an id of a desired speaking style. The audio feature and the user id are input into a pre-trained audio-driven three-dimensional facial animation model, to output a bs value of a corresponding frame, which is transmitted to ue4 (an unreal engine). Various scenarios and a required blend shape have been built in the ue4, with being rendered to the mobile phone through the ue4.

In another exemplary embodiment, description is made by using an advertisement broadcasted on a large screen as an example. Audio is obtained through a built-in recording system or an internal text to speech (TTS for short) system, and then feature extraction is performed on the audio by using an audio preprocessing module. A user id is preset to an id of a desired speaking style. The audio feature and the user id are input into a pre-trained audio-driven three-dimensional facial animation model, to output a bs value of a corresponding frame, which is transmitted to ue4 (an unreal engine). Various scenarios and a required blend shape have been built in the ue4, with being rendered to the large screen through the ue4.

Therefore, an animation generation speed is greatly improved by replacing a RNN (recurrent neural network) that is conventionally used in the field with the audio-driven animation model in this embodiment of this application through audio encoding, and a speech animation can be generated in a real-time manner based on the audio. In combination with speaker encoding, the audio encoding manner in this embodiment of this application can achieve better reproduction of the lip animation and the facial expression at the same time. The audio-driven animation model in this embodiment of this application can generate a speaking animation of a specified character style through speaker encoding, which is suitable for various application scenarios. Meanwhile, the audio-driven animation model can receive speech audio from different languages, different sound-receiving devices, and different speakers, and supports TTS, which is suitable for various application scenarios.

In an embodiment, as shown in FIG. 5, the apparatus for outputting a blend shape value further includes a training module 510.

The training module 510 is configured to train the audio-driven animation model by using sample data. The sample data includes collected audio data of a speaking object, facial data of the speaking object that is collected synchronously with the audio data, and a sample blend shape value corresponding to the facial data. The facial data includes a lip shape and a facial expression.

It should be noted that this embodiment of this application further includes a processing module for preprocessing the audio data, and the processing module is configured to perform data collecting, data screening, and data optimizing. Data is preprocessed by using the processing module to obtain the sample data, which is used by the training module for training the audio-driven animation model.

An example is made by using an iphone as a data collection device. As a data collection device, the iphone can implement real-time face capture with low costs due to structured light and the built-in arkit technology of the iphone. During actual data collection, 40 fixed sentences can be used, and 20 actors speak to the iPhone with specific expressions in a same environment. The iphone is used to record audio when the actor is speaking, and 52 blend shapes (bs for short) are carried in each frame of arkit. Subsequently, data screening is performed, to manually screen out data with better quality, and exclude various environmental reasons or actor errors. Finally, considering accuracy of the data, the data is manually optimized by an animator, and an inaccurate part in the data is optimized by means of animating manually. The optimized data is the training data that can be used later.

In an embodiment, the training module 510 includes:
a feature extraction unit, configured to extract a local feature vector of the audio data by using an automatic speech recognition model;
an encoding unit, configured to input the local feature vector into the audio encoding layer including multiple convolutional layers, determine an input feature vector of a next layer at a (2t−n)/2 time point based on an input feature vector of a previous layer between a t time point and a t−n time point, determine a feature vector having a causal relationship with the input feature vector of the previous layer as a valid local feature vector, and output sequentially audio encoding features corresponding to the audio data based on the valid local feature vector of each layer;
an input unit, configured to input an identifier corresponding to the facial data of the speaking object into the one-hot encoding layer to obtain an identifier encoding feature corresponding to the identifier, wherein different facial data corresponds to different speaking styles, and the identifier is used to indicate the speaking style;
an output unit, configured to splice the audio encoding feature and the identifier encoding feature for encoding and decoding, to output a predicted blend shape value corresponding to the audio data, wherein the predicted blend shape value corresponds to the identifier; and
a training unit, configured to train, based on an error between the sample blend shape value and the predicted blend shape value, a model parameter of the audio-driven animation model by using a loss function.

It should be noted that, in actual use, a generalized audio feature extraction manner is required due to various sound receiving devices and sound sources. Therefore, an automatic speech recognition model, such as a masr model or a deepspeech model, is used to perform feature extraction on speech. Feature extraction is performed on the audio by obtaining a feature of an intermediate layer. An advantage of this is that the speech recognition model is trained with a large number of corpora, and the obtained audio feature has good generalization to different languages, different receiving devices, and different speakers.

The training module 510 uses a deep learning network, an input thereof is the audio feature and a user id (which is equivalent to the identifier) when the data is recorded, and an output thereof is a blend shape value at corresponding time. To preserve a facial expression while speaking, the speaking styles of different recording personnel are encoded, and a one-hot encoding manner is used herein for direct encoding. An audio code includes both general pronunciation information and information about a small amount of personalized speaking styles.

In an embodiment, the training unit is configured to: obtain a reconstruction error, a velocity error, and an acceleration error between the sample blend shape value and the predicted blend shape value by using an L2 loss function; and
train the model parameter of the audio-driven animation model based on the reconstruction error, the velocity error, and the acceleration error.

It should be noted that the L2 loss function can be used during the training. To reproduce a captured blend shape coefficient, an L2 error between a real blend shape coefficient and a predicted blend shape coefficient is calculated. And to make a prediction effect more accurate and stable, errors of orders 1-3 can be calculated. Physical meanings of the errors correspond to the reconstruction error, the velocity error, and the acceleration error, respectively.

In an embodiment, the output unit is configured to: splice and output the audio encoding feature and the identifier encoding feature to an encoding layer, to obtain a spliced feature code, where the encoding layer includes three fully-connected network layers; and
input the spliced feature code into a decoding layer, through which the predicted blend shape value corresponding to the identifier is outputted, wherein the decoding layer includes three fully-connected network layers.

In an embodiment, the output module 508 is configured to splice the target-audio encoding feature and the target-identifier encoding feature for encoding and decoding, to output the blend shape value corresponding to the target audio data.

As shown in FIG. 4, the training process of the audio-driven animation model includes feature encoding, feature splicing, and output of the blend shape value. To achieve a more realistic three-dimensional facial animation, a user code (which is equivalent to a target identifier code) is spliced with the audio code. While ensuring that the pronunciation information is sufficiently generalized, character personalization information is added to achieve better reproduction of the lip animation and the facial expression. The spliced features are sent to a network having an architecture of an encoder and a decoder. Output of a decoder module is a final blend shape coefficient, wherein both the encoder and the decoder can be composed of a three-layer fully connected network.

In an embodiment, as shown in FIG. 5, the apparatus for outputting a blend shape value further includes:
a display module 512, configured to display a video image corresponding to the blend shape value on a display screen based on the blend shape value corresponding to the target audio data and a three-dimensional scenario corresponding to the target identifier.

During actually driving, the audio is first obtained by an audio receiving device, and then feature extraction is performed on the audio by using an audio preprocessing module. The user id is preset to an id of a desired speaking style. The audio feature and the user id are input into a pre-trained audio-driven three-dimensional facial animation model, to output a bs value of a corresponding frame, which is transmitted to ue4 (an unreal engine). Various scenarios and a required blend shape have been built in the ue4, with being rendered to various terminal devices through the ue4.

Figure 6:
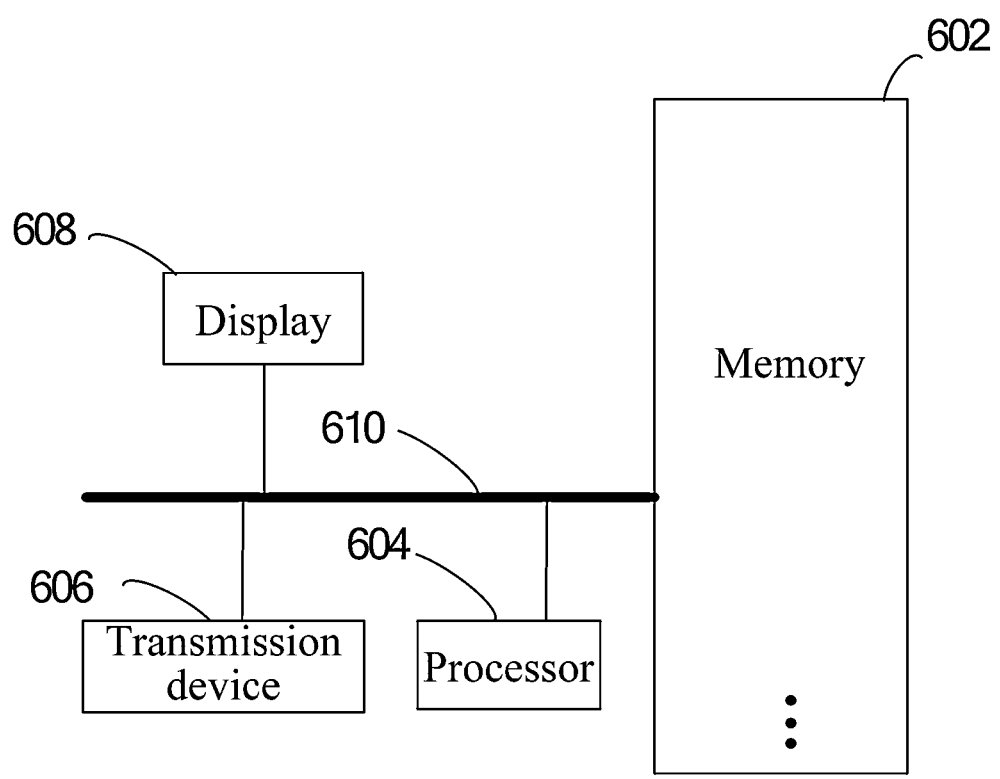
FIG. 6 is a schematic structural diagram of an optional electronic device according to an embodiment of this application.

According to still another aspect of an embodiment of this application, an electronic device for implementing the foregoing method for outputting a blend shape value is further provided. The electronic device can be, but is not limited to be applied to a server. As shown in FIG. 6, the electronic device includes a memory 602 and a processor 604. The memory 602 stores a computer program. The processor 604 is configured to perform the steps in any one of the foregoing method embodiments through the computer program.

Optionally, in this embodiment, the electronic device can be located in at least one of a plurality of network devices in a computer network.

Optionally, in this embodiment, the processor can be configured to perform the following steps through the computer program:

S1. Performing feature extraction on obtained target audio data, to obtain a target audio feature vector;

S2. Inputting the target audio feature vector and a target identifier into an audio-driven animation model, wherein the target identifier is an identifier selected from preset identifiers used to indicate preset speaking styles, and the audio-driven animation model includes an audio encoding layer and a one-hot encoding layer;

S3. Inputting the target audio feature vector into the audio encoding layer including multiple convolutional layers, determining an input feature vector of a next layer at a (2t−n)/2 time point based on an input feature vector of a previous layer between a t time point and a t−n time point, determining a feature vector having a causal relationship with the input feature vector of the previous layer as a valid feature vector, outputting sequentially target-audio encoding features based on the valid feature vector of each layer, and inputting the target identifier into the one-hot encoding layer for binary vector encoding, to obtain a target-identifier encoding feature, where n<t; and S4. Outputting a blend shape value corresponding to the target audio data based on the target-audio encoding feature and the target-identifier encoding feature by using the audio-driven animation model, wherein the blend shape value is used to indicate a lip animation and a facial expression of a virtual object, and the blend shape value corresponds to the target identifier.

Optionally, a person skilled in the art may understand that the structure shown in FIG. 6 is only illustrative, and the electronic device may also be a terminal device such as a smart phone (such as an Android phone or an iOS phone), a tablet computer, a palmtop computer, a mobile Internet device (MID), or a PAD. FIG. 6 does not constitute a limitation on a structure of the foregoing electronic device.

For example, the electronic device can further include more or less components (such as a network interface) than those shown in FIG. 6, or can have a configuration different from that shown in FIG. 6.

The memory 602 can be configured to store software programs and modules, such as program instructions/modules corresponding to the method and the apparatus for outputting a blend shape value in the embodiments of this application. The processor 604 runs the software programs and the modules that are stored in the memory 602 to implement various function applications and data processing, that is, implement the foregoing method for outputting a blend shape value. The memory 602 can include a high-speed random access memory, and can further include a non-volatile memory, such as one or more magnetic storage devices, a flash memory, or another non-volatile solid-state memory. In some embodiments, the memory 602 can further include memories remotely disposed with respect to the processor 604, and these remote memories can be connected to the mobile terminal through a network. Examples of the foregoing network include, but are not limited to the Internet, an intranet, a local area network, a mobile communications network, and a combination thereof. The memory 602 can be specifically, but is not limited to be configured to perform program steps of the method for outputting a blend shape value.

Optionally, a transmission device 606 is configured to receive or send data through a network. Specific examples of the foregoing network can include a wired network and a wireless network. In an example, the transmission device 606 includes a network adapter (network interface controller, NIC), which can be connected to another network device and router through a network cable, to communicate with the Internet or a local area network. In an example, the transmission device 606 is a radio frequency (RF) module, and is configured to communicate with the Internet in a wireless manner.

In addition, the foregoing electronic device further includes: a display 608, configured to display a training process; and a connection bus 610, configured to connect various module components in the foregoing electronic device.

An embodiment of this application further provides a computer readable storage medium. The storage medium comprising a computer program stored thereon, which, on being run, is configured to implement the steps in any one of the foregoing method embodiments.

Optionally, in this embodiment, the storage medium can be configured to store the computer program that is configured to perform following steps:

S1. Performing feature extraction on obtained target audio data, to obtain a target audio feature vector;

S2. Inputting the target audio feature vector and a target identifier into an audio-driven animation model, wherein the target identifier is an identifier selected from preset identifiers used to indicate preset speaking styles, and the audio-driven animation model includes an audio encoding layer and a one-hot encoding layer;

S3. Inputting the target audio feature vector into the audio encoding layer including multiple convolutional layers, determining an input feature vector of a next layer at a $(2t-n)/2$ time point based on an input feature vector of a previous layer between a t time point and a t−n time point, determining a feature vector having a causal relationship with the input feature vector of the previous layer as a valid feature vector, outputting sequentially a target-audio encoding feature based on the valid feature vector of each layer, and inputting the target identifier into the one-hot encoding layer for binary vector encoding, to obtain a target-identifier encoding feature, wherein $n<t$; and S4. Outputting a blend shape value corresponding to the target audio data based on the target-audio encoding feature and the target-identifier encoding feature by using the audio-driven animation model, wherein the blend shape value is used to indicate a lip animation and a facial expression of a virtual object, and the blend shape value corresponds to the target identifier.

Optionally, the storage medium is further configured to store a computer program that is used for performing the steps included in the method in the foregoing embodiments. Details are not described in this embodiment.

Optionally, in this embodiment, persons of ordinary skills in the art can understand that all or some of the steps in various methods in the foregoing embodiments can be completed by instructing hardware related to a terminal device through a program. The program can be stored on a computer readable storage medium. The storage medium cam include: a flash drive, a read-only memory (ROM), a random access memory (RAM), a magnetic disk, or a compact disc.

Sequence numbers in the foregoing embodiments of this application are only for description, and do not represent superiority or inferiority of the embodiments.

If an integrated unit in the foregoing embodiment is implemented in a form of a software functional unit and is sold or used as an independent product, it can be stored on the foregoing computer readable storage medium. On the basis of such understanding, the technical solutions of this application essentially, or parts of the technical solutions of this application that attribute to the prior art, or all or part of the technical solutions can be represented in the form of software products. A computer software product can be stored on a storage medium, and includes a plurality of instructions to enable one or more computer devices (which may be a personal computer, a server, or a network device) to implement all or some steps of the method in all embodiments of this application.

In the foregoing embodiments of this application, the description of each embodiment has its own focus. For a part that is not described in detail in an embodiment, reference can be made to related descriptions of other embodiments.

In the embodiments provided in this application, it should be understood that the disclosed client can be implemented in other manners. For example, the device embodiments described above are merely exemplary. For example, the division of units is only a division of logical functions. In actual implementations, there may be other division manners. For example, a plurality of units or components can be combined or can be integrated into another system, or some features can be ignored or not implemented. In addition, the displayed or discussed mutual coupling or direct coupling or communication connection can be indirect coupling or communication connections through some interfaces, units, or modules, which can be in electrical or other forms.

The units described as separated parts can be or can not be physically separated; and parts displayed as units can be or can not be physical unit, that is, can be located at one place or can be distributed on a plurality of network units. Some or all of the units can be selected according to actual requirements to achieve the objectives of the solutions of the embodiments.

In addition, all functional units in the embodiments of this application can be integrated into one processing unit, or each unit can exist alone physically, or two or more units can be integrated into one unit. The foregoing integrated unit can be implemented in a form of hardware, or can be implemented in a form of a software function unit.

Merely preferred implementations of this application are described above. It should be noted that for persons of ordinary skills in the art, improvements and modifications can be made without departing from the principles of this application, and these improvements and modifications should also be considered as being subject to the protection scope of this application.

What is claimed is:

1. A method for outputting a blend shape value, comprising:
  performing feature extraction on obtained target audio data, to obtain a target audio feature vector;
  inputting the target audio feature vector and a target identifier into an audio-driven animation model, wherein the target identifier is an identifier selected from preset identifiers used to indicate preset speaking styles, and the audio-driven animation model comprises an audio encoding layer and a one-hot encoding layer;
  inputting the target audio feature vector into the audio encoding layer comprising multiple convolutional layers, determining an input feature vector of a next layer at a $(2t-n)/2$ time point based on an input feature vector of a previous layer between a t time point and a t-n time point, determining a feature vector having a causal relationship with the input feature vector of the previous layer as a valid feature vector, outputting sequentially target-audio encoding features based on the valid feature vector of each layer, and inputting the target identifier into the one-hot encoding layer for binary vector encoding, to obtain a target-identifier encoding feature, wherein $n<t$; and
  outputting a blend shape value corresponding to the target audio data based on the target-audio encoding feature and the target-identifier encoding feature by using the audio-driven animation model, wherein the blend shape value is used to indicate a lip animation and a facial expression of a virtual object, and the blend shape value corresponds to the target identifier.

2. The method according to claim 1, wherein before the inputting the target audio feature vector and a target identifier into an audio-driven animation model, the method further comprises:
  training the audio-driven animation model by using sample data, wherein the sample data comprises collected audio data of a speaking object, facial data of the speaking object that is collected synchronously with the audio data, and a sample blend shape value corresponding to the facial data, and the facial data comprises a lip shape and a facial expression.

3. The method according to claim 2, wherein the training the audio-driven animation model by using sample data comprises:
  extracting a local feature vector of the audio data by using an automatic speech recognition model;
  inputting the local feature vector into the audio encoding layer comprising multiple convolutional layers, determining an input feature vector of a next layer at a $(2t-n)/2$ time point based on an input feature vector of a previous layer between a t time point and a t-n time point, determining a feature vector having a causal relationship with the input feature vector of the previous layer as a valid local feature vector, and outputting sequentially audio encoding features corresponding to the audio data based on the valid local feature vector of each layer;
  inputting an identifier corresponding to the facial data of the speaking object into the one-hot encoding layer to obtain an identifier encoding feature corresponding to the identifier, wherein different facial data corresponds to different speaking styles, and the identifier is used to indicate the speaking style;
  splicing the audio encoding feature and the identifier encoding feature for encoding and decoding, to output a predicted blend shape value corresponding to the audio data, wherein the predicted blend shape value corresponds to the identifier; and
  training, based on an error between the sample blend shape value and the predicted blend shape value, a model parameter of the audio-driven animation model by using a loss function.

4. The method according to claim 3, wherein the training, based on an error between the sample blend shape value and the predicted blend shape value, a model parameter of the audio-driven animation model by using a loss function comprises:
  obtaining a reconstruction error, a velocity error, and an acceleration error between the sample blend shape value and the predicted blend shape value by using an L2 loss function; and
  training the model parameter of the audio-driven animation model based on the reconstruction error, the velocity error, and the acceleration error.

5. The method according to claim 3, wherein the splicing the audio encoding feature and the identifier encoding feature for encoding and decoding comprises:
  splicing and outputting the audio encoding feature and the identifier encoding feature to an encoding layer, to obtain a spliced feature code, wherein the encoding layer comprises three fully-connected network layers; and
  inputting the spliced feature code into a decoding layer, through which the predicted blend shape value corresponding to the identifier is outputted, wherein the decoding layer comprises three fully-connected network layers.

6. The method according to claim 1, wherein the outputting a blend shape value corresponding to the target audio data based on the target-audio encoding feature and the target-identifier encoding feature by using the audio-driven animation model comprises:
  splicing the target-audio encoding feature and the target-identifier encoding feature for encoding and decoding, to output the blend shape value corresponding to the target audio data.

7. The method according to claim 1, wherein after outputting the blend shape value corresponding to the target audio data, the method further comprises:
  displaying a video image corresponding to the blend shape value on a display screen based on the blend shape value corresponding to the target audio data and a three-dimensional scenario corresponding to the target identifier.

8. A non-transitory computer readable storage medium, comprising a computer program stored thereon, which, on being run, is configured to execute the method according to claim 1.

9. An electronic device, comprising a memory and a processor, wherein a computer program is stored in the memory, and the processor is configured to run the computer program to execute the method according to claim 1.

* * * * *